United States Patent
Tolson et al.

(10) Patent No.: US 12,115,656 B1
(45) Date of Patent: Oct. 15, 2024

(54) MODULAR ROBOTIC ARM

(71) Applicant: Ally Robotics, Inc., Bellevue, WA (US)

(72) Inventors: Robert Mitchell Tolson, Duvall, WA (US); Troy M. Swartwood, Seattle, WA (US); Jordan Lucas Heintz, Issaquah, WA (US)

(73) Assignee: Ally Robotics, Inc., Bellevue, WA (US)

( * ) Notice: Subject to any disclaimer, the term of this patent is extended or adjusted under 35 U.S.C. 154(b) by 0 days.

(21) Appl. No.: 18/196,417

(22) Filed: May 11, 2023

Related U.S. Application Data

(60) Provisional application No. 63/340,924, filed on May 11, 2022.

(51) Int. Cl.
*B25J 17/00* (2006.01)
*B25J 9/12* (2006.01)
*B25J 15/00* (2006.01)
*B25J 19/00* (2006.01)
*F16H 57/08* (2006.01)

(52) U.S. Cl.
CPC ........... *B25J 15/0061* (2013.01); *B25J 9/126* (2013.01); *B25J 19/0025* (2013.01); *F16H 57/082* (2013.01)

(58) Field of Classification Search
CPC ......... B25J 9/126; B25J 17/0258; F16H 1/14; F16H 1/20; F16H 1/22; F16H 37/08; F16H 1/222
See application file for complete search history.

(56) References Cited

U.S. PATENT DOCUMENTS

| | | |
|---|---|---|
| 4,545,723 A | 10/1985 | Clark |
| 4,853,771 A | 8/1989 | Witriol et al. |
| 4,919,950 A | 4/1990 | Mak |
| 4,922,435 A | 5/1990 | Cahlander et al. |
| 5,132,914 A | 7/1992 | Cahlander et al. |
| 5,285,604 A | 2/1994 | Carlin |
| 5,386,762 A | 2/1995 | Gokey |
| 5,389,764 A | 2/1995 | Nishii et al. |
| 5,458,384 A | 10/1995 | Liu et al. |

(Continued)

FOREIGN PATENT DOCUMENTS

| | | |
|---|---|---|
| GB | 2611769 A | 4/2023 |
| GB | 2611873 A | 4/2023 |

(Continued)

OTHER PUBLICATIONS

"Encoders," JamesNewton, Web page, https://github.com/HaddingtonDynamics/Dexter/wiki/Encoders, 7 pages, dated Oct. 22, 2021, retrieved on May 11, 2023.

*Primary Examiner* — Randell J Krug
(74) *Attorney, Agent, or Firm* — Lund IP, PLLC

(57) ABSTRACT

Modular robotic arms include modular sections with a joint and arm segment. In some examples, the modular sections may connect to each other using common tooling flanges, such as a standard robotic interface for an end effector. In the same or different examples, a robotic arm controller is located in a base or other section for the robotic arm. In the same or different examples, a robotic arm joint includes a differential gear with two motors. Coordinated control of the two differential joint motors facilitates both hinge and rotary motion for the joint.

24 Claims, 16 Drawing Sheets

(56) References Cited

U.S. PATENT DOCUMENTS

| | | | |
|---|---|---|---|
| 5,466,025 A | 11/1995 | Mee | |
| 5,833,295 A | 11/1998 | Farlow, Jr. | |
| 5,893,051 A | 4/1999 | Tomohiro | |
| 6,043,483 A | 3/2000 | Schreiber | |
| 7,174,830 B1 | 2/2007 | Dong | |
| 7,706,918 B2 | 4/2010 | Sato et al. | |
| 7,920,962 B2 | 4/2011 | D et al. | |
| 7,971,450 B2 | 7/2011 | Furlanetto et al. | |
| 8,276,505 B2 | 10/2012 | Buehler et al. | |
| 8,610,037 B2 | 12/2013 | Polt et al. | |
| 8,820,313 B1 | 9/2014 | Lutes | |
| 9,285,589 B2 | 3/2016 | Osterhout et al. | |
| 9,483,875 B2 | 11/2016 | Theimer et al. | |
| 9,542,621 B2 | 1/2017 | He et al. | |
| 9,785,911 B2 | 10/2017 | Galluzzo et al. | |
| 9,815,191 B2 | 11/2017 | Oleynik et al. | |
| 10,005,184 B2 | 6/2018 | Gerio et al. | |
| 10,112,771 B2 | 10/2018 | D'andrea et al. | |
| 10,154,756 B2 | 12/2018 | Hall et al. | |
| 10,271,674 B2 | 4/2019 | Ge | |
| 10,293,488 B2 | 5/2019 | Hall et al. | |
| 10,576,622 B2 * | 3/2020 | Hutson | B25J 9/102 |
| 10,682,765 B2 | 6/2020 | Mirkhaef et al. | |
| 11,192,258 B2 | 12/2021 | Sinnet et al. | |
| 11,518,050 B2 * | 12/2022 | Cui | B25J 19/0029 |
| 11,541,555 B2 * | 1/2023 | Cui | B25J 17/0258 |
| 11,577,401 B2 | 2/2023 | Sinnet et al. | |
| 2002/0028127 A1 | 3/2002 | Hart et al. | |
| 2002/0082924 A1 | 6/2002 | Koether et al. | |
| 2004/0111321 A1 | 6/2004 | Kargman | |
| 2004/0154474 A1 | 8/2004 | Chan | |
| 2005/0049940 A1 | 3/2005 | Tengler et al. | |
| 2005/0193901 A1 | 9/2005 | Buehler et al. | |
| 2008/0110347 A1 | 5/2008 | Wong | |
| 2009/0192921 A1 | 7/2009 | Hicks | |
| 2011/0153614 A1 | 6/2011 | Solomon | |
| 2012/0253513 A1 * | 10/2012 | Unsworth | F16M 11/14 |
| | | | 700/245 |
| 2013/0033057 A1 | 2/2013 | Markham | |
| 2013/0275236 A1 | 10/2013 | Koke et al. | |
| 2013/0302483 A1 | 11/2013 | Riefenstein et al. | |
| 2014/0031978 A1 | 1/2014 | Takata | |
| 2014/0157698 A1 | 6/2014 | Cihak et al. | |
| 2014/0184496 A1 | 7/2014 | Gribetz et al. | |
| 2014/0203012 A1 | 7/2014 | Corona et al. | |
| 2014/0324607 A1 | 10/2014 | Frehn et al. | |
| 2014/0334691 A1 | 11/2014 | Cho et al. | |
| 2014/0363266 A1 | 12/2014 | Cooper et al. | |
| 2015/0290795 A1 | 10/2015 | Oleynik et al. | |
| 2016/0067866 A1 | 3/2016 | Sekar et al. | |
| 2016/0078694 A1 | 3/2016 | Swift et al. | |
| 2016/0180546 A1 | 6/2016 | Kim et al. | |
| 2016/0239705 A1 | 8/2016 | Masood et al. | |
| 2016/0307459 A1 | 10/2016 | Chestnut et al. | |
| 2016/0327279 A1 | 11/2016 | Bhogal et al. | |
| 2016/0327281 A1 | 11/2016 | Bhogal et al. | |
| 2016/0334799 A1 | 11/2016 | D'andrea et al. | |
| 2017/0011319 A1 | 1/2017 | Elliot et al. | |
| 2017/0116661 A1 | 4/2017 | Sundaram et al. | |
| 2017/0130968 A1 | 5/2017 | Nagraj et al. | |
| 2017/0169315 A1 | 6/2017 | Vaca et al. | |
| 2017/0178070 A1 | 6/2017 | Wang et al. | |
| 2017/0206431 A1 | 7/2017 | Sun et al. | |
| 2017/0252922 A1 | 9/2017 | Levine et al. | |
| 2017/0305015 A1 | 10/2017 | Krasny et al. | |
| 2017/0348854 A1 | 12/2017 | Oleynik | |
| 2017/0364073 A1 | 12/2017 | Guy | |
| 2018/0029222 A1 | 2/2018 | Oleynik | |
| 2018/0036889 A1 | 2/2018 | Birkmeyer et al. | |
| 2018/0345485 A1 | 12/2018 | Sinnet et al. | |
| 2018/0365630 A1 | 12/2018 | Seals et al. | |
| 2019/0176338 A1 | 6/2019 | Zito et al. | |
| 2019/0321989 A1 | 10/2019 | Anderson et al. | |
| 2020/0046168 A1 | 2/2020 | Sinnet et al. | |
| 2020/0047349 A1 | 2/2020 | Sinnet et al. | |
| 2020/0121125 A1 | 4/2020 | Zito et al. | |
| 2020/0269434 A1 | 8/2020 | Anderson et al. | |
| 2021/0022559 A1 | 1/2021 | Zito et al. | |
| 2022/0354306 A1 | 11/2022 | Sinnet et al. | |
| 2022/0386807 A1 | 12/2022 | Sinnet et al. | |

FOREIGN PATENT DOCUMENTS

| | | |
|---|---|---|
| JP | 2009106734 A | 5/2009 |
| JP | 2015009039 A | 1/2015 |
| WO | 2015143800 A1 | 10/2015 |

* cited by examiner

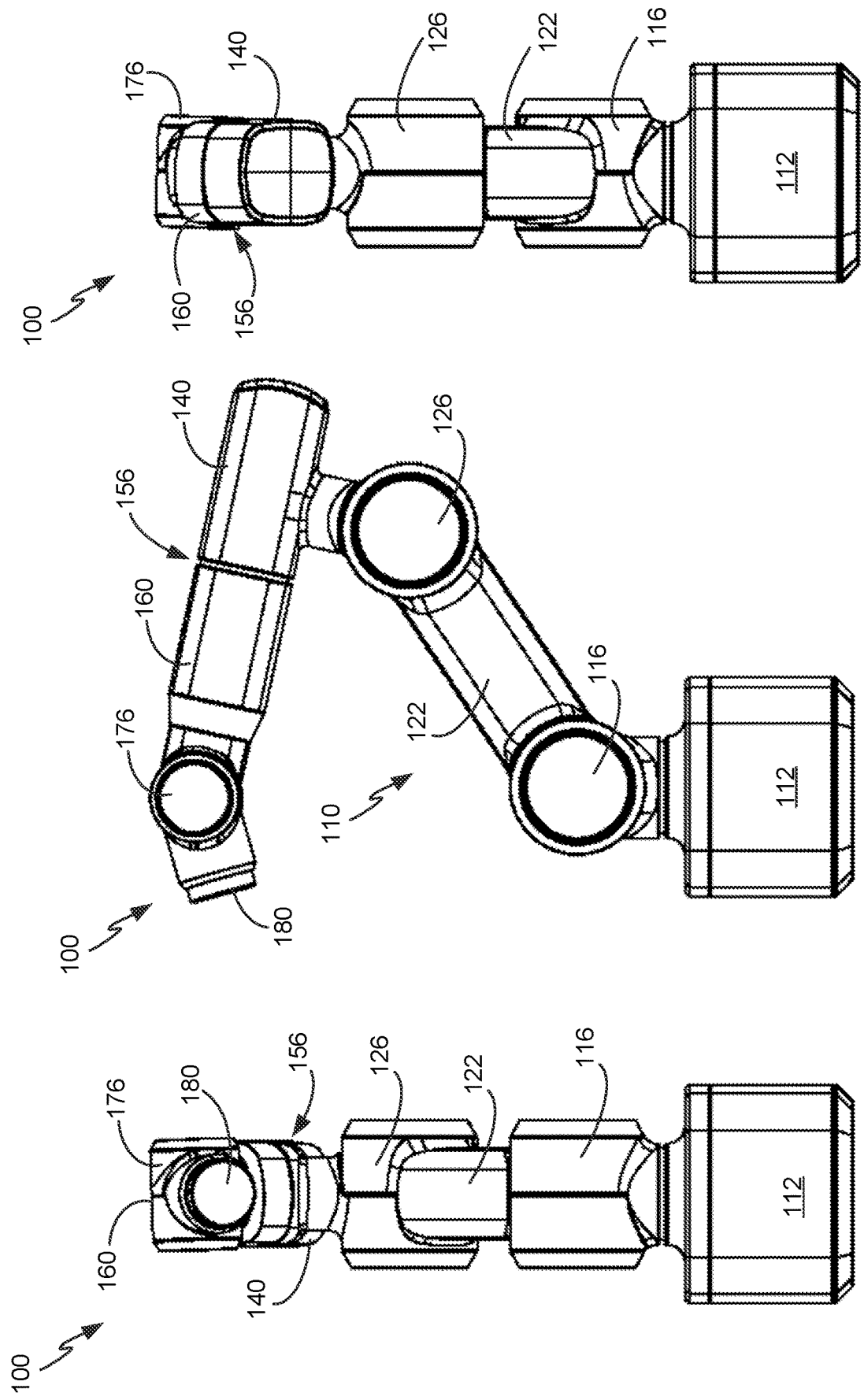

MODULAR ROBOTIC ARM

RELATED APPLICATION

This application claims the benefit of and priority to U.S. Provisional Application No. 63/340,924, filed May 11, 2022, which is hereby incorporated by reference for all purposes.

TECHNICAL FIELD

This disclosure relates to robotic arms and robotic systems.

BACKGROUND

Robotic arms include a plurality of articulated links. Links may be connected by hinge or rotary joints. Each joint is controlled in unison to articulate the arm and locate an end effector in position to facilitate a desired operation. An end effector is a device configured to attach to a robotic arm via a mechanical interface. End effectors are designed to enable a robot to perform its task(s). Various end effectors may include grippers, welders, sprayers, grinders, sanders, cutting implements and other mechanisms.

BRIEF SUMMARY

Modular robotic arms as disclosed herein include modular sections with a joint and arm segments. In some examples, the modular sections may connect to each other using common tooling flanges, such as a standard robotic interface for an end effector.

In the same or different examples, a robotic arm controller is located in a base section or arm section for the robotic arm.

In the same or different examples, a robotic arm joint includes a differential gear with two motors. Coordinated control of the two differential joint motors facilitates both hinge and rotary motion for the joint. The differential gear includes a central aperture through a drive facilitating cable routing to more distal arm segments and an end effector.

BRIEF DESCRIPTION OF THE DRAWINGS

FIGS. 1A-1I illustrate a modular robotic arm including differential joints and a controller in a base or other section of the robotic arm.

DETAILED DESCRIPTION

Figure 1A:
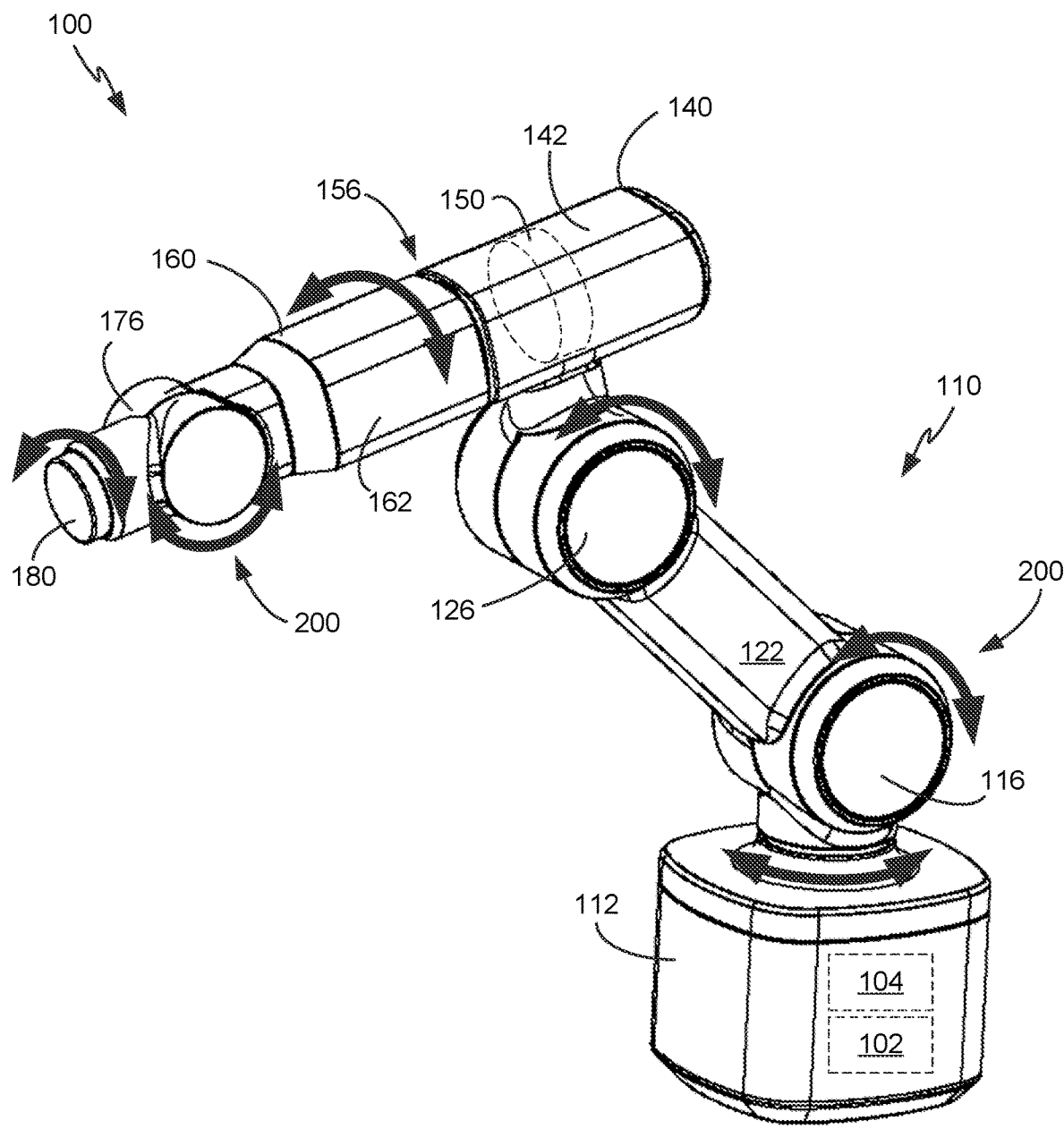
Figure 1E:
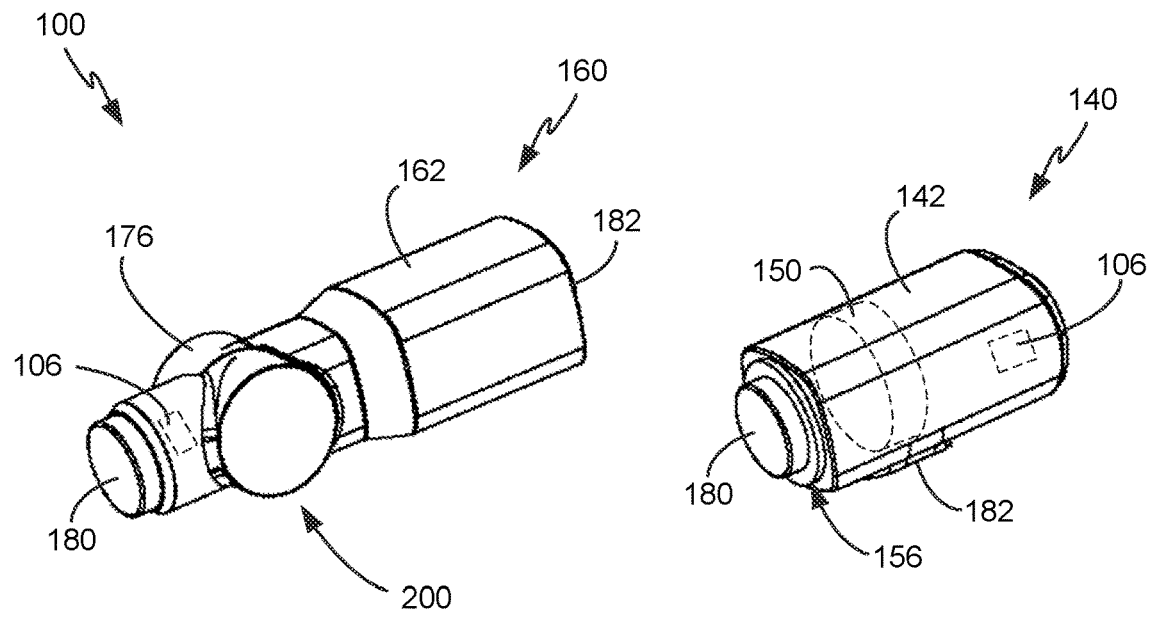
Figure 1E:
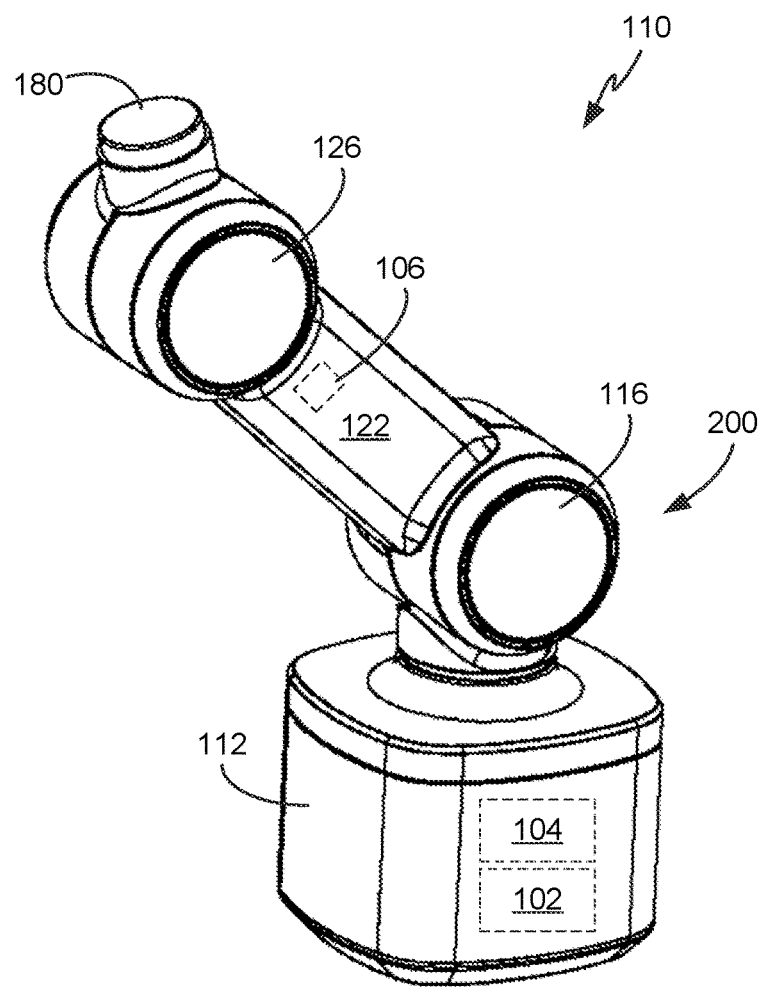
Figure 1G:
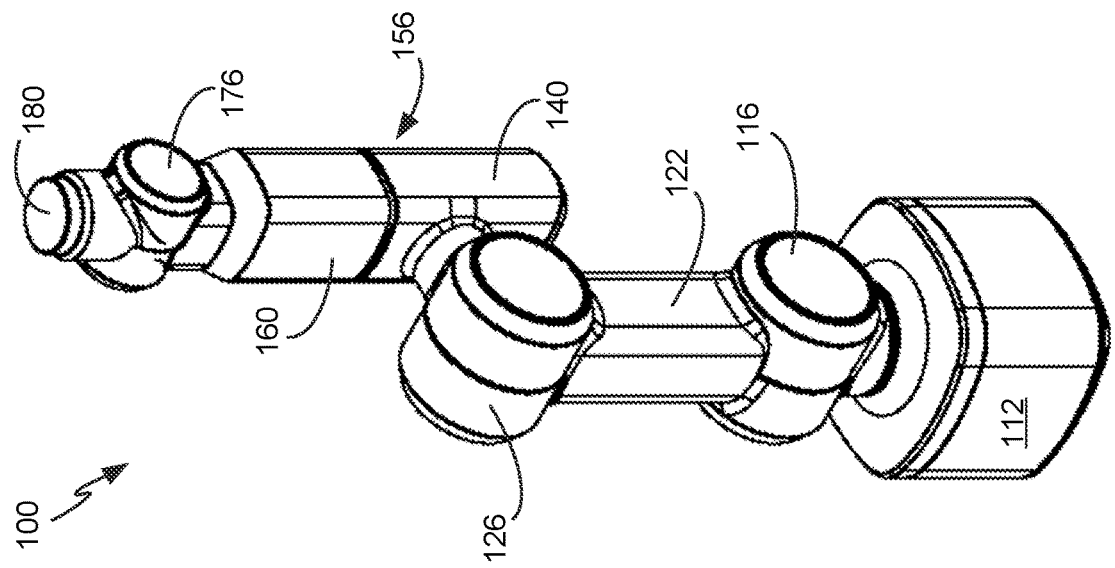
Figure 1F:
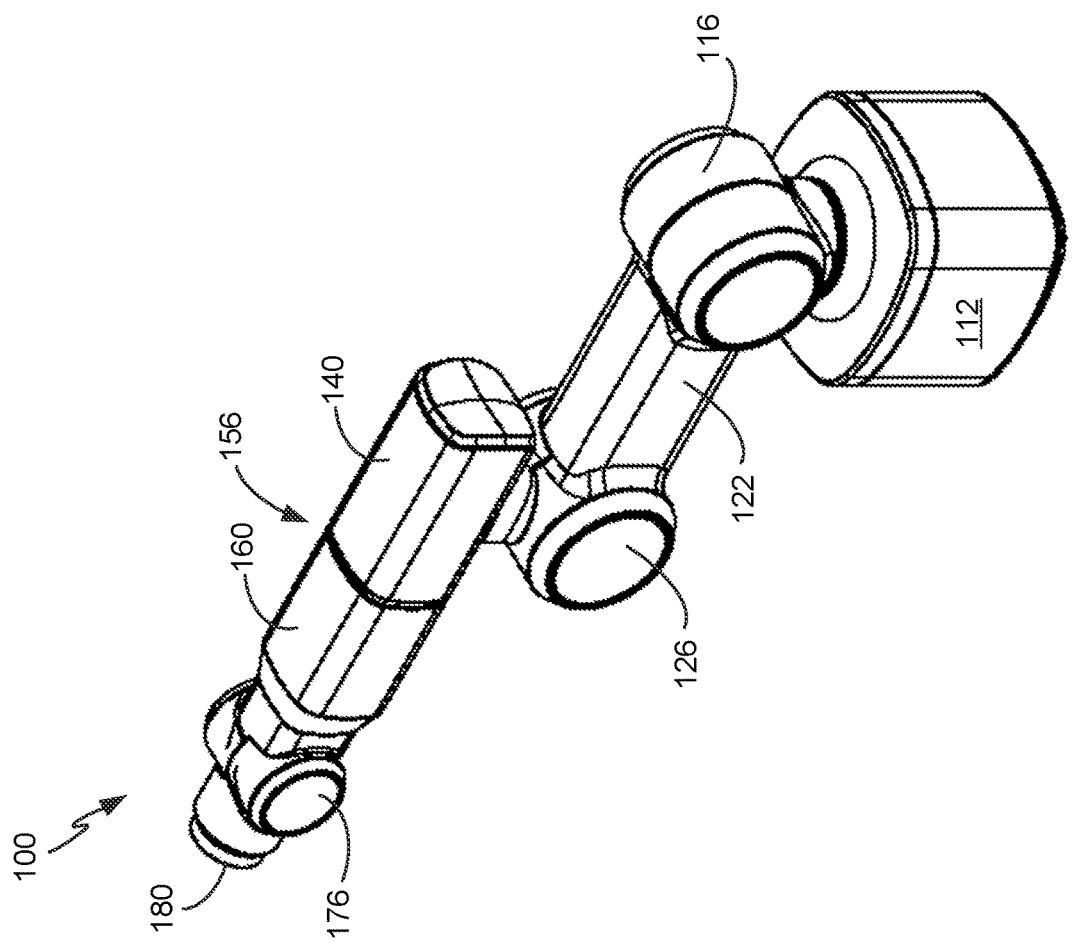
Figure 1H:
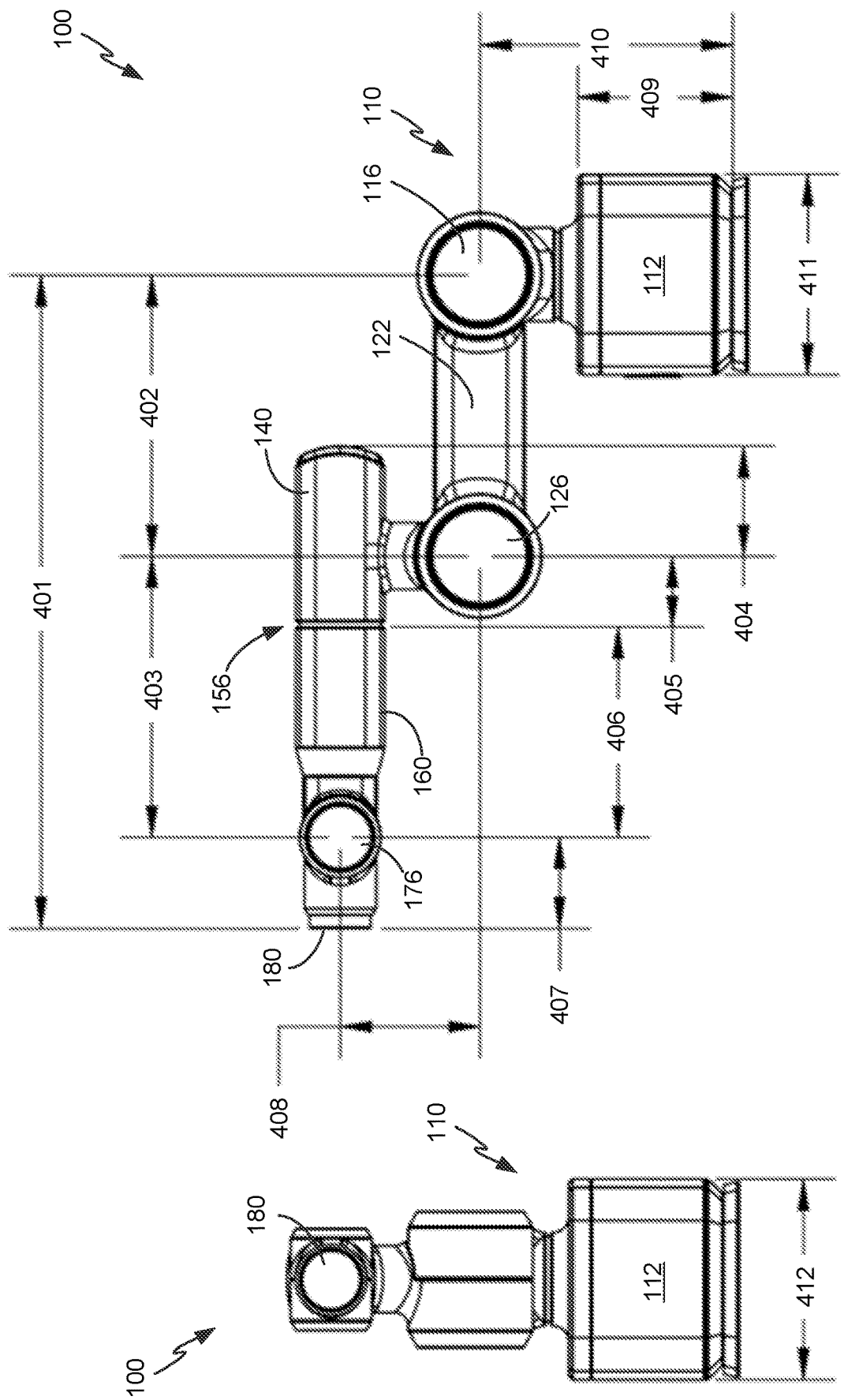

FIGS. 1A-1I illustrate a modular robotic arm 100 including differential joints 116, 176 and a controller 102 in a base section 110 of the robotic arm 100. FIGS. 1A-1D are isometric, front, side, and rear views respectively of the robotic arm 100. FIG. 1E is a perspective view of the different modular sections of robotic arm 100 including a base section 110, a middle section 140, and a distal section 160. FIGS. 1F and 1G are also isometric views of the robotic arm 100. FIG. 1A illustrates the robotic arm 100 in a posed position, whereas FIG. 1F illustrates the robotic arm 100 in a full horizontal extension position, and FIG. 1G illustrates the robotic arm 100 in a full vertical extension position. FIG. 1H includes front and side views of the robotic arm 100 in a full horizontal extension position with dimension notations, and FIG. 1I includes front and side views of the robotic arm 100 in a full vertical extension position with dimension notations.

Figure 2:
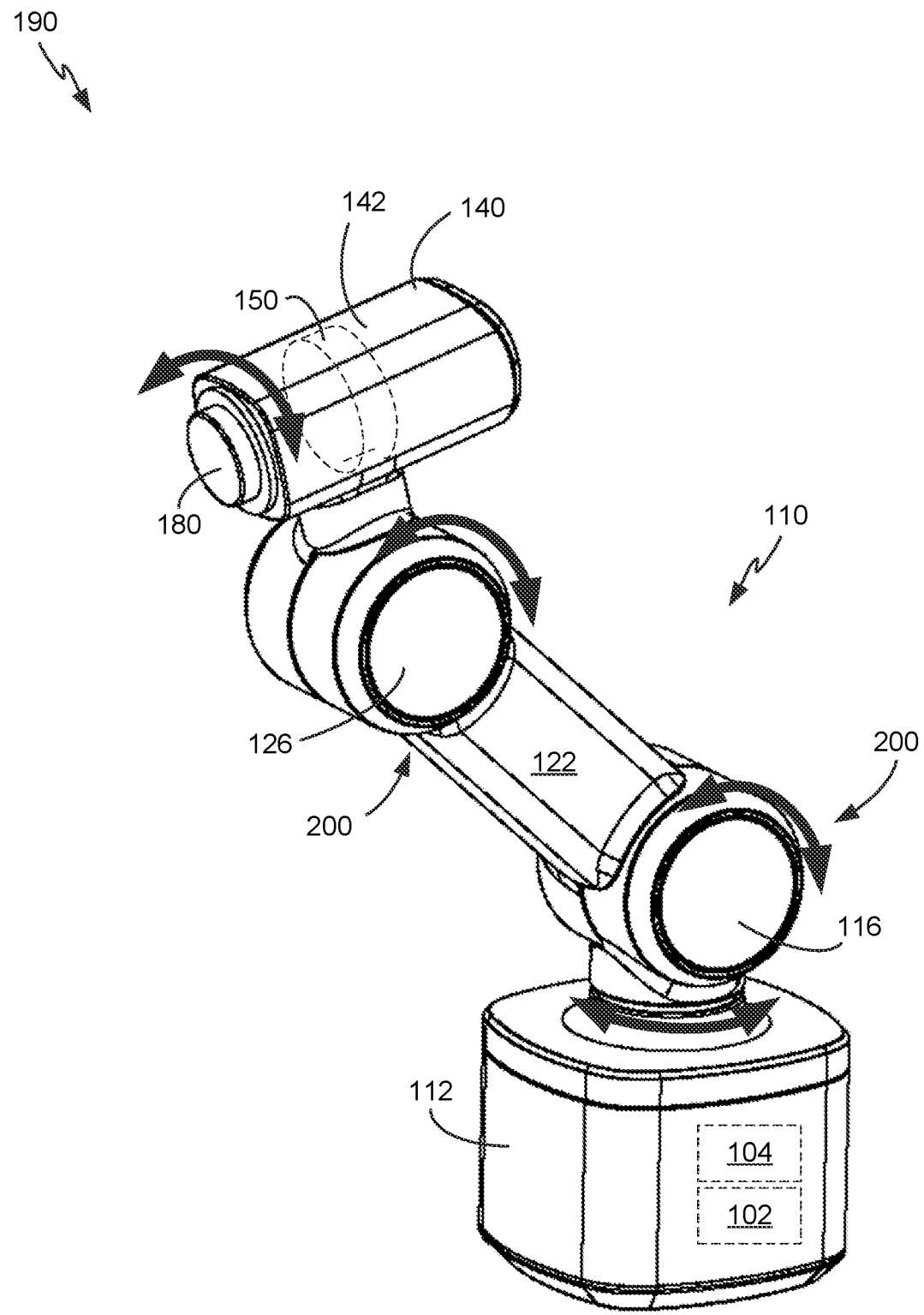
FIG. 2 illustrates a different configuration of the modular robotic arm of FIGS. 1A-1I.

Robotic arm 100 includes three modular sections: a base section 110, a middle section 140, and a distal section 160. The three modular sections may be interconnected with standard robotic interfaces providing mechanical, power and data connections between the sections. Data connections support two-way control and sensing feedback communications between the electronic components of robotic arm 100. Due to the standard interfaces between the modular sections, the modular sections may be added or removed to form customized robotic arms including more than three modular sections or as few as a single section. For example, FIG. 2 illustrates a configuration with base section 110 and middle section 140, but no distal section 160. In such an example, an end effector may simply be coupled to the distal tooling flange 180 of the middle section 140.

Base section 110 includes a proximal base 112 and a first arm segment 122 with a base joint 116 between the first arm segment 122 and the proximal base 112. A first arm joint 126 is on the opposite side of first arm segment 122 relative to the base joint 116. A first distal tooling flange 180 is on the opposite side of the first arm joint 126. Base joint 116 is shown as providing both hinged and rotary motion, whereas arm joint 126 is shown as providing only hinged motion.

Middle section 140 couples to the distal tooling flange 180 of the base section 110. Specifically, middle section 140 includes a first mating tooling flange 182 for coupling to the distal tooling flange 180 of the base section 110. The mating tooling flange 182 is attached to an arm segment 142, and a second arm joint 156 is between a second distal tooling flange 180 and arm segment 142. Arm joint 156 is shown as providing only rotary motion driven by a single motor 150.

Distal section 160 couples to the distal tooling flange 180 of the middle section 140. Specifically, distal section 160 includes a second mating tooling flange 182 for coupling to the distal tooling flange 180 of the middle section 140. The mating tooling flange 182 is attached to an arm segment 162, and a third arm joint 176 is between a third distal tooling flange 180 and arm segment 162. Arm joint 176 is shown as providing both hinged and rotary motion, which may be provided by a differential joint assembly 200. In other examples, the hinged and rotary motion of arm joint 176 may be implemented with distinct hinge and rotary joints.

Robotic arm 100 may further include an end effector with a third mating tooling flange for coupling to the distal tooling flange 180 of the distal section 160. End effector functions can be split into three categories: automation, process, and sensing.

In the automation category, there are several types of end effectors that are used to carry out industrial automation tasks, including grippers, magnets, and vacuum heads. Grippers allow industrial robots to manipulate a component at an advanced level. They are primarily used to hold components, move them, and release them accurately at a desired location. Magnet end effectors use magnetic force to accurately locate, pick up, and move ferrous materials. Vacuum head tooling is primarily used to move non-porous surface parts.

End effectors in the process category include devices that are used in specific manufacturing processes, including welding and painting. Example processes for end effectors include weld tooling, drill or cutting tools, grinding, and sanding tools, brushes, sprayers, screwdrivers, adhesive dispensing, and paint spray guns.

End effectors in the sensing category include position sensors, touch sensors and sensors for part inspection and robot vision guidance. End effectors may combine components from the same or different categories. For example, a single end effector may include multiple sensors combined with automation and/or process components.

The distal tooling flanges 180 and the mating tooling flanges 182 form a joint providing a mechanical connection, a power connection, and a data connection across the interface of the flanges. The distal tooling flanges 180 and the mating tooling flanges 182 may conform to one or more standard robotic interfaces for end effectors. Suitable standard robotic interfaces for end effectors include, but are not limited to, ISO end effector interface standards, such as, ISO 9409-1, for example, ISO 9409-1-50-4-M6, ISO 9409-2, and ISO 29262. Other interfaces including proprietary interfaces may also be used.

In the example of robotic arm 100, proximal base 112 includes a controller 102. Controller 102 serves to operate each of the joints of robotic arm 100 as well as the end effector according to a control program. Locating controller 102 in proximal base 112 or within the arm as part of one of sections 140, 160 may provide one or more advantages compared to robotic arms with separate controllers. As one example, a separate controller may require power or control cable routing to the robotic arm. In contrast, locating controller 102 in proximal base 112 or within the arm as part of one of sections 140, 160 allows such cabling to run within arm 100. As another example, a separate controller occupies space within a robotic operation area. Either the controller may be located remotely, in which case, additional cabling is required, or the controller may interfere with the motion range of the robotic arm. Further, in examples in which a robotic arm is mounted to a ceiling, providing a mounting location and/or cabling for a separate control unit causes additional complexity during installation of the robotic arm.

In examples where controller 102 is located in base section 110, base section 110 further includes control cables extending from the controller 102 to its distal tooling flange 180. In turn, middle section 140 includes control cables extending from its mating tooling flange 182 to its distal tooling flange 180. Likewise, distal section 160 includes control cables extending from its mating tooling flange 182 to its distal tooling flange 180. In some examples, proximal base 112 further includes a power supply 104, such as a battery, DC power supply, AC/DC converter, AC power supply or other power supply. In such examples, the control cables are configured to deliver power from the power supply to the distal tooling flange 180 of distal section 160.

In examples where controller 102 is in one of arm sections, control cables extend from the controller to the distal tooling flange 180 via the intervening arm sections. Wherever the controller is located, the control cables also extend from the controller 102 to each motor of the arm joints 116, 126, 156, 176.

As shown in FIG. 1E, robotic arm 100 may include one or more position sensors 106. Positions sensors 106 may include accelerometers, gyroscopes, magnetometers, inertial measurement systems, or other position sensor. In some examples, the position sensor(s) 106 may be incorporated into controller 102. In such examples, it may be advantageous to locate the controller 102 and position sensor(s) 106 in the arm section closest to the end effector: distal section 160. In other examples one or more position sensors 106 may be located remotely from controller 102 and the control cables may connect the position sensors 106 to the controller 102.

Controller 102 may use position sensors 106 for monitoring and positioning of arm 100. For example, sensing data may be used for error correction to the position of the end of arm tooling (EOAT) connected to the tooling flange 180 of distal section 160. As another example, sensing data indicating an unexpected acceleration may represent an impact or mechanical damage. As another example, controller 102 may determine discrete arm position based both on sensing from position sensors 106, vision sensors or other sensors, and/or to support a predefined limit to the acceleration of the end effector.

Arm segments 122, 142, 162 and arm joints 116, 126, 156, 176 may include central apertures to facilitate routing power and/or control cables through the interior of robotic arm 100. As one example, one or more of arm joints 116, 126, 156, 176 may include a differential joint assembly 200 as described with respect to FIGS. 3A-3H. However, in the depicted example, arm joints 126, 156 represent simple rotary joints.

The different modular sections of robotic arm 100 may be sized according to design requirements of the robotic arm. In addition, otherwise identical segments of varying length may be selected for different applications, such that the same design may provide different reach according to an end user's requirements. In some examples, the different motors and joints for different sections of robotic arm 100 may be of common sizes. Using common sized components throughout robotic arm 100 may simplify manufacturing and improve efficiency of a robotic arm manufacturing supply chain. In other examples, more distally located components (such as the components of distal section 160) may be lighter to reduce loading on the robotic arm.

While the particular relative and absolute sizes of the various components of the robotic arm 100 may vary, shown below are example dimensions the inventors found suitable for one particular application. All dimensions are shown in millimeters.

Figure 1I:
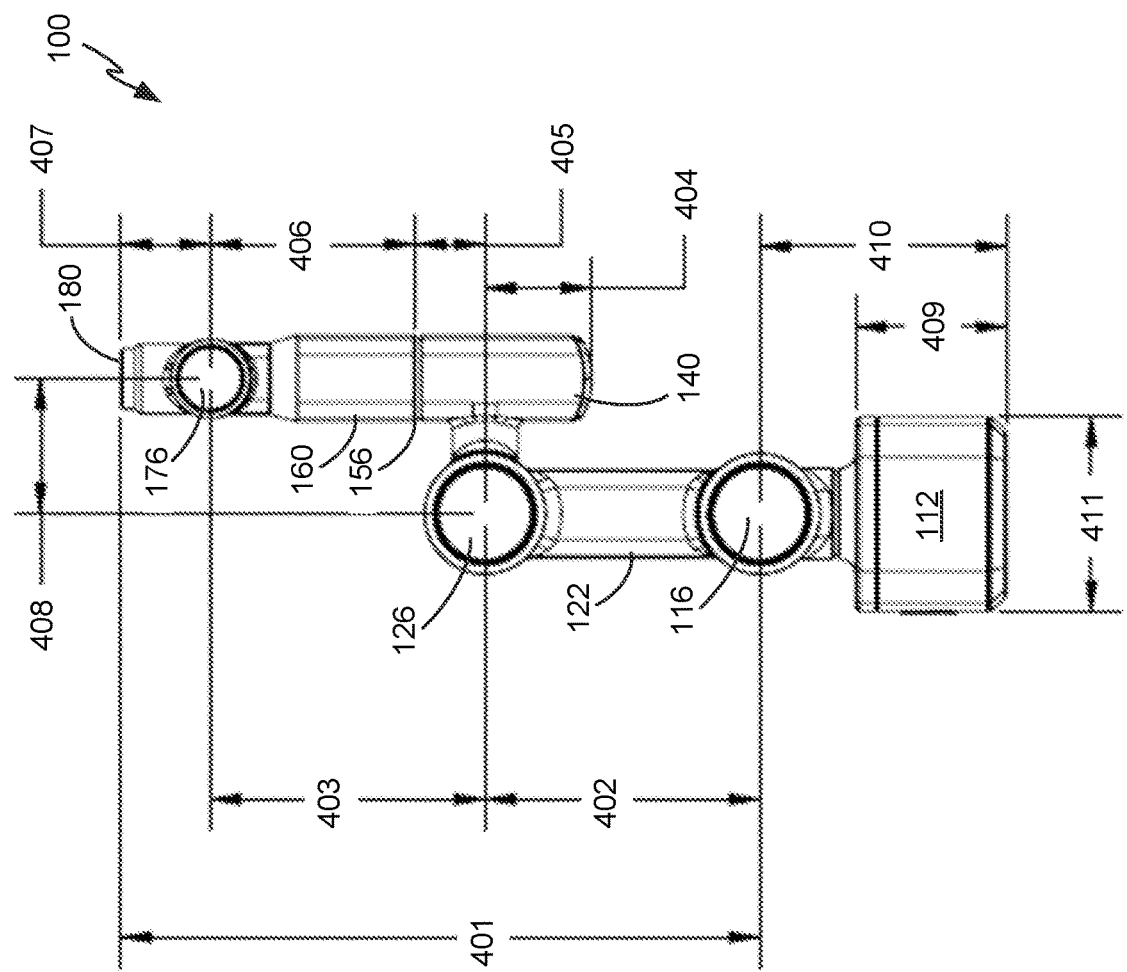
Figure 1I:
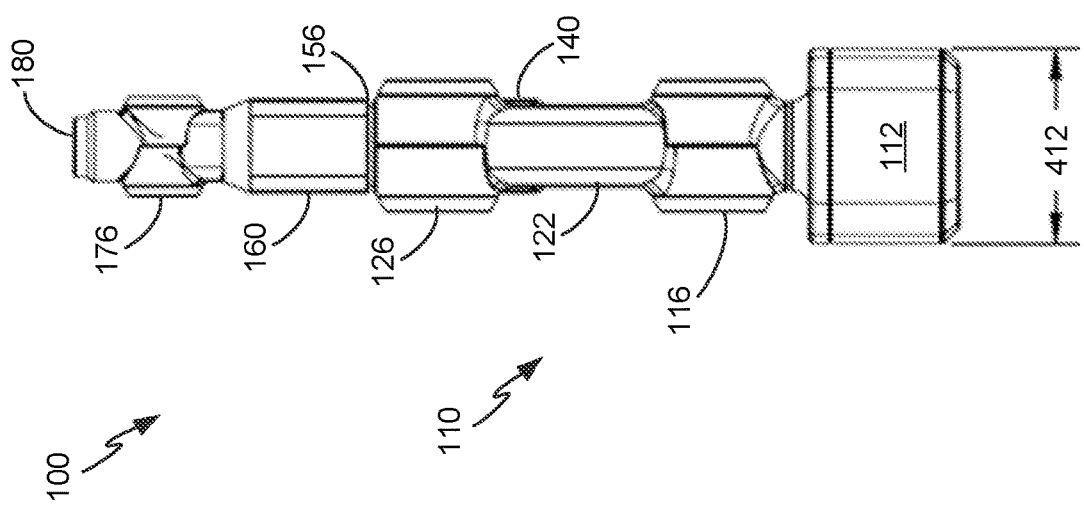

FIG. 1H includes front and side views of the robotic arm 100 in a full horizontal extension position with dimension notations, and FIG. 1I includes front and side views of the robotic arm 100 in a full vertical extension position with dimension notations. While the particular relative and absolute sizes of the various components of the robotic arm 100 may vary, shown in TABLE 1 below are example dimensions the inventors found suitable for one particular application. All dimensions are shown in millimeters (mm).

TABLE 1

| Sample dimensions | | | Reach 550 mm | Reach 700 mm | |
|---|---|---|---|---|---|
| Arm | Reach | 401 | 550 mm | 700 mm | 401 is the sum of |
| | | 402 | 225 mm | 300 mm | 402 + 403 + 407 |
| | | 403 | 225 mm | 300 mm | |
| | | 407 | 100 mm | 100 mm | |
| | Base | 409 | 190 mm | 190 mm | |
| | | 410 | 310 mm | 310 mm | |
| | | 411 | 250 mm | 250 mm | |
| | | 412 | 250 mm | 250 mm | |
| | Offset | 408 | 170 mm | 170 mm | |
| | Other | 404 | 100 mm | 100 mm | |
| | | 405 | 85 mm | 85 mm | |
| | | 406 | 140 mm | 215 mm | 406 is 403 − 405 |

Figure 3A:
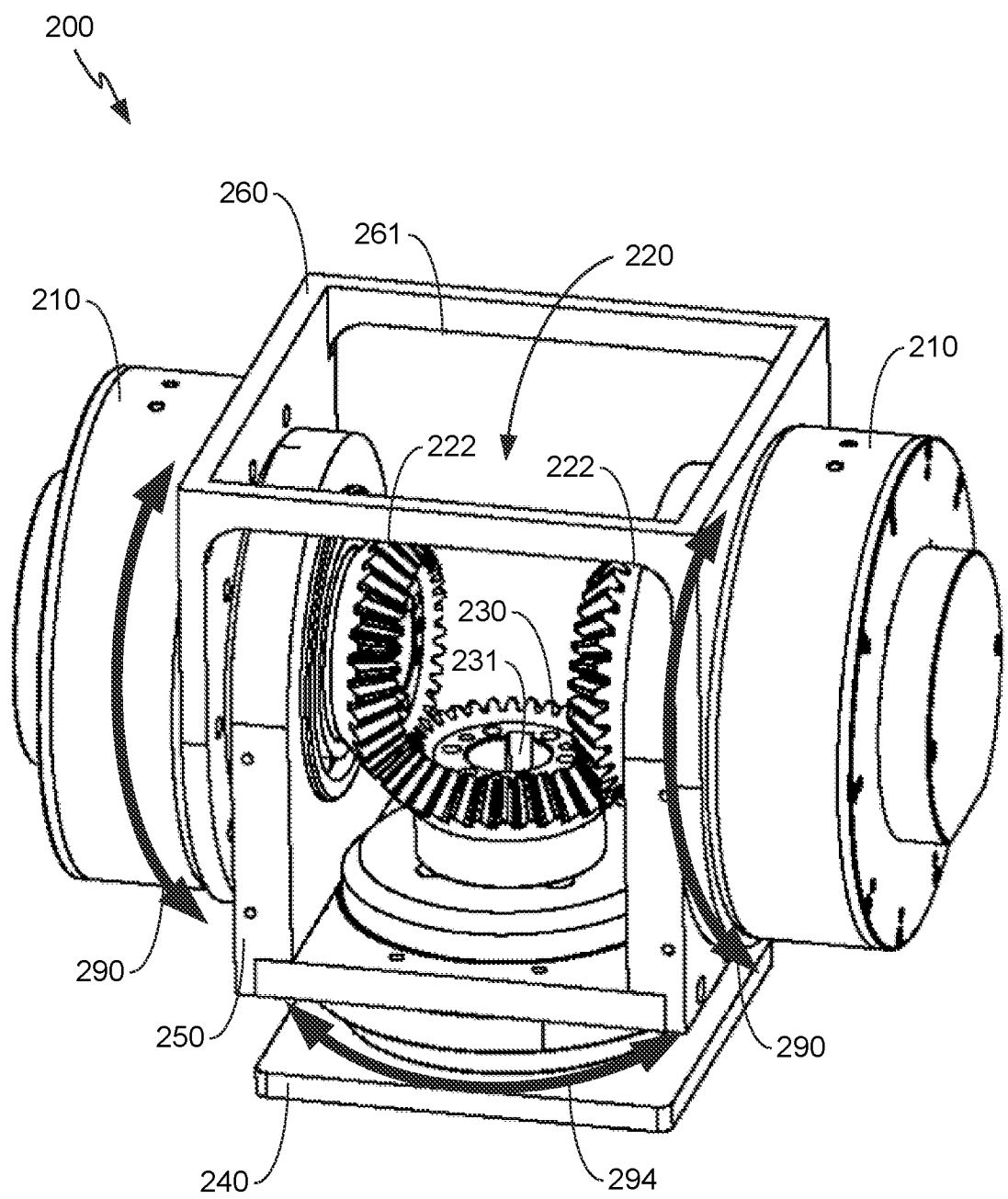
FIGS. 3A-3H illustrate an example differential joint with two motors suitable for use in the modular robotic arm of FIGS. 1A-1I.
Figure 3B:
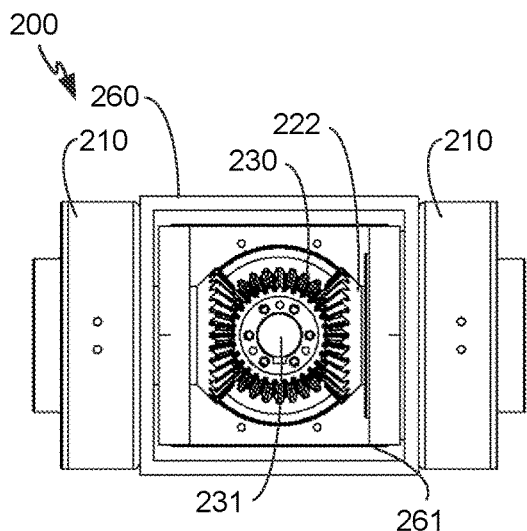
Figure 3E:
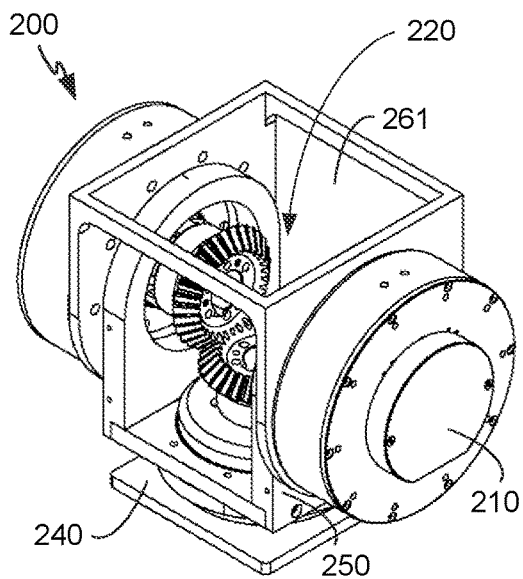
Figure 3C:
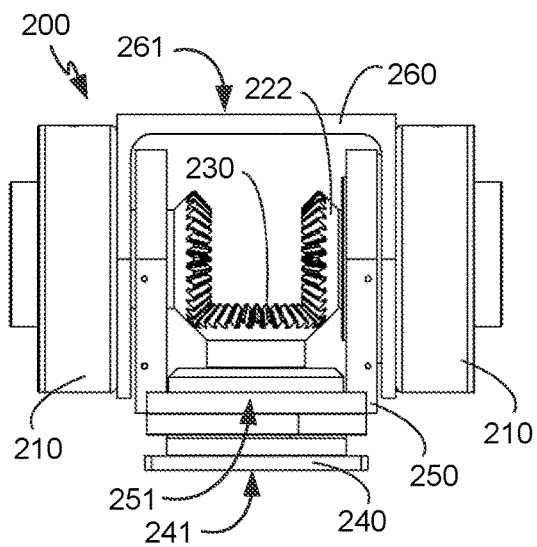
Figure 3F:
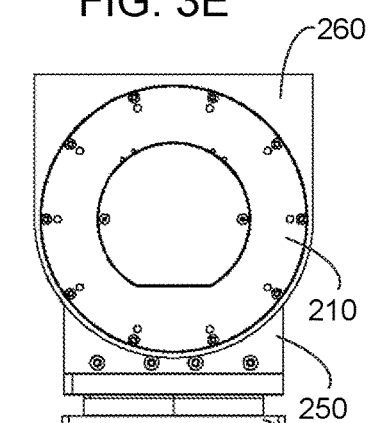
Figure 3D:
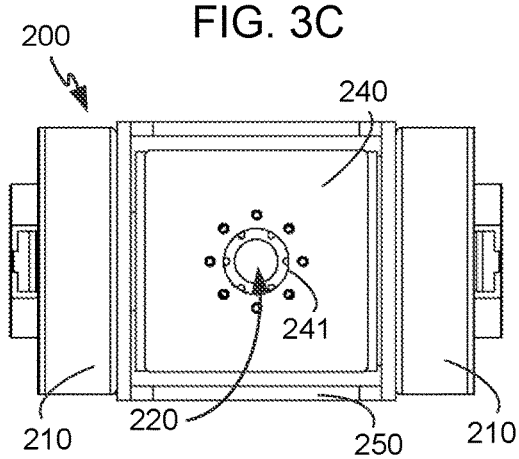
Figure 3G:
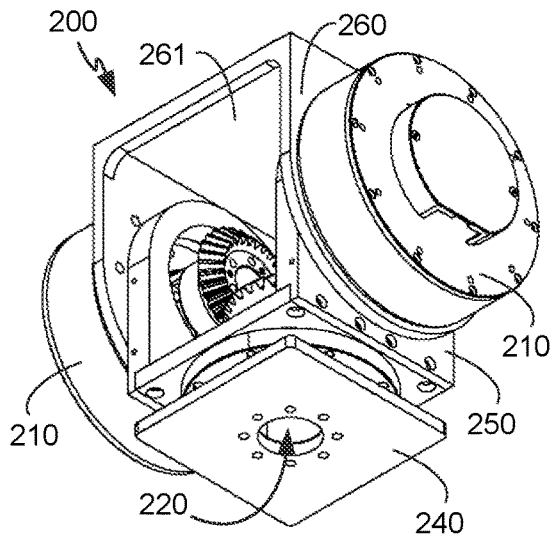
Figure 3H:
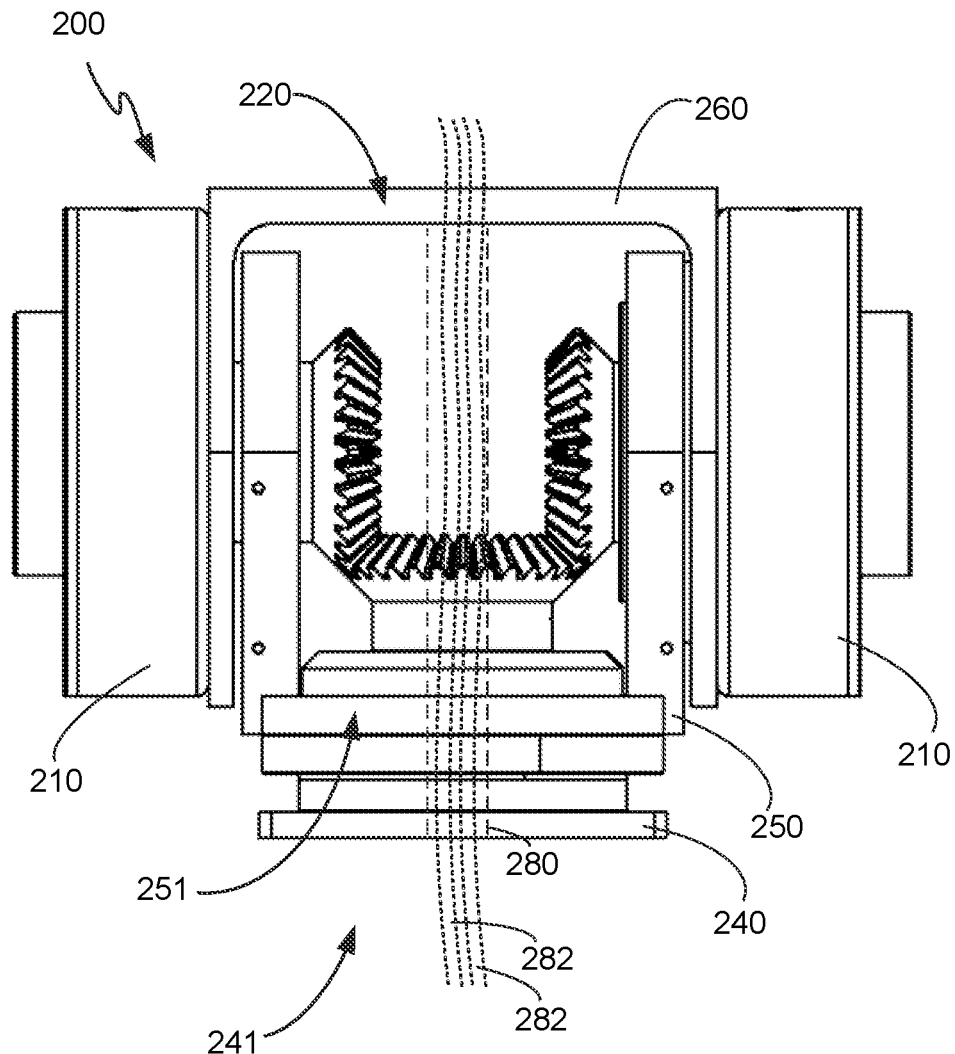

FIGS. 3A-3H illustrate a differential joint assembly 200. FIGS. 3A, 3E and 3G are different isometric views of differential joint assembly 200. FIGS. 3B, 3C, 3D, 3F are top, front, bottom, and side views respectively of the differential joint assembly 200. FIG. 3H is a side view of the differential joint assembly 200 showing cables and a cable routing sleeve extending through a cable routing path 220 of differential joint assembly 200

Differential joint assembly 200 provides both hinged motion 290 and rotary motion 294 and may be particularly well-suited for use in a robotic arm joint, such as one or more of arm joints 116, 126, 156, 176 in robotic arm 100, and one or more of arm joints 316, 326, 356, in robotic arm 300.

Differential joint assembly 200 includes a carrier 250 a planet gear 230 rotatably coupled to the carrier 250 about a planet gear rotational axis. Differential joint assembly 200 further includes a flange 240 fixedly coupled to the planet gear 230 such that it is rotatably coupled to the carrier 250 about the planet gear rotational axis. A first sun gear 222 is engaged with the planet gear 230 and rotatably coupled to the carrier 250 about a sun gear rotational axis, and a second sun gear 222 engaged with the planet gear 230 and rotatably coupled to the carrier 250, the second sun gear 222 in axial alignment with and opposing the first sun gear 222. Two motors 210 independently drive the sun gears 222. In other examples, more than two motors may be used to drive the sun gears 222.

Specifically, a first motor 210 includes a first motor drive is coupled to the first sun gear 222 such that it is rotatably coupled to the carrier 250 about the sun gear rotational axis, and a second motor 210 includes a second motor drive coupled to the second sun gear 222 such that it is rotatably coupled to the carrier 250 about the sun gear rotational axis.

Differential joint assembly 200 further includes a motor support structure 260 fixedly attached to a first housing of the first motor 210 and further fixedly attached to a second housing of the second motor 210. The motor support structure 260 is rotatably coupled to the carrier 250 about the sun gear rotational axis.

In a robotic arm, flange 240 is fixedly coupled to a first arm segment on a first side of differential joint assembly 200, whereas motor support structure 260 is fixedly coupled to a second arm segment on an opposing side of differential joint assembly 200. Coordinating the operation of the two motors 210 allows both rotary motion between the flange 240 and the carrier 250 and hinged motion between the carrier 250 and the motor support structure 260. Thus, differential joint assembly 200 facilitates both hinged and rotary motion between the arm segments coupled to the flange 240 and the motor support structure 260.

Differential joint assembly 200 includes a cable routing path 220. The cable routing path 220 includes a flange aperture 241, the central aperture 231 of the planet gear 230, a carrier 250 aperture 251, and a motor support structure aperture 261. Control and power wires may extend through the cable routing path 220. Such wire routing may be particularly useful in examples where differential joint assembly 200 is incorporated into a robotic arm, such as robotic arms 100, 190, 300.

FIG. 3H illustrates two cables 282 routed through cable routing path 220. Cables 282 may represent power and/or control cables. In other examples, more than two cables may be routed through cable routing path 220. In addition, cables 282 are within a sleeve 280 such that sleeve 280 surrounds control and power wires extending through cable routing path 220. Sleeve 280 serves to constrain cables 282 within cable routing path 22 to prevent cables 282 from interfering with the gearing and moving parts of differential joint assembly 200. In some examples, sleeve 280 may include discrete retractable sleeve mechanisms that extend and retract as motor support structure 260 rotates across the sun gear axis to bend cables 282 and maintain alignment with motor support structure aperture 261.

Figure 4A:
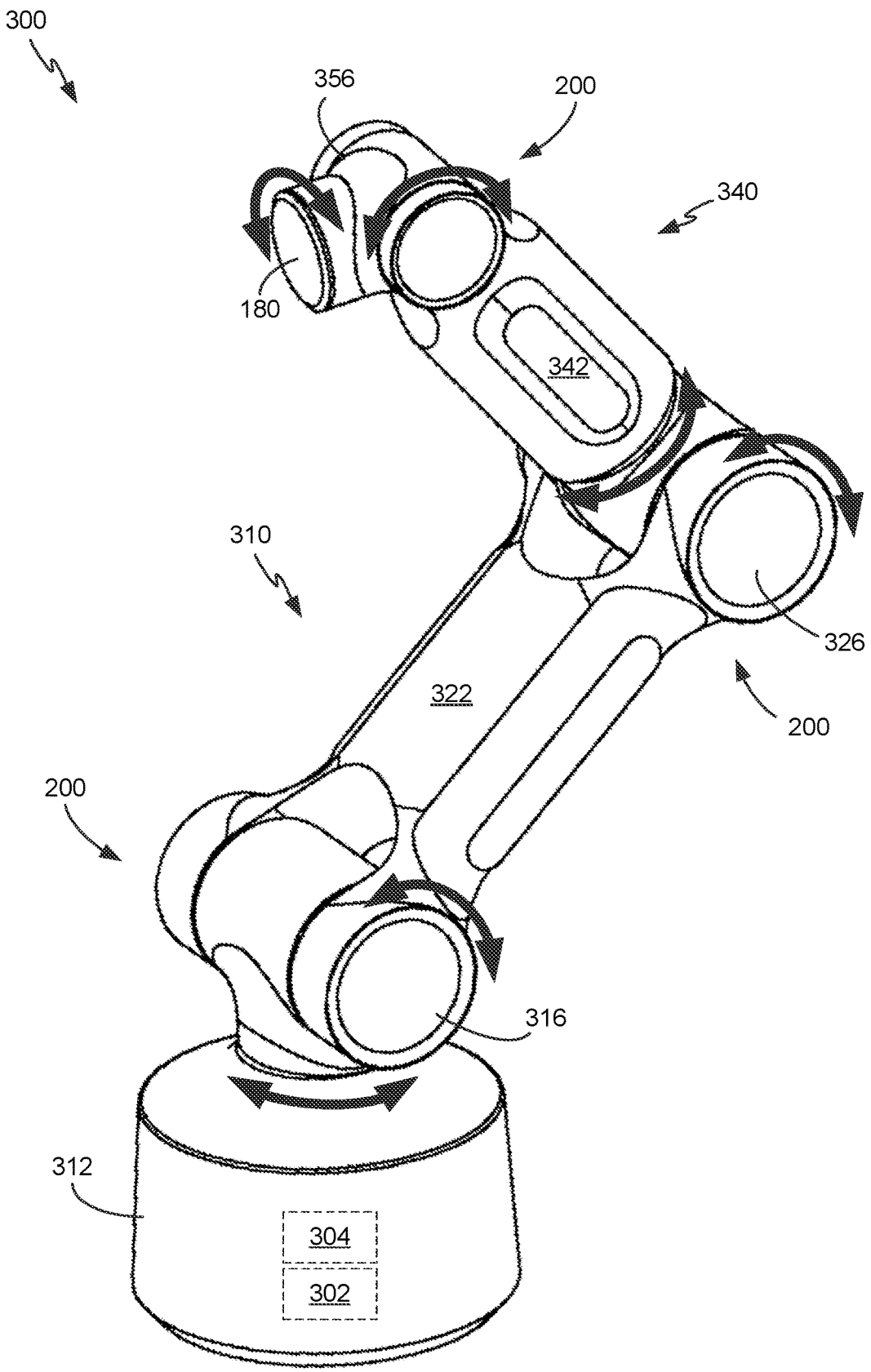
FIGS. 4A-4I illustrate a modular robotic arm including differential joints and a controller in a base or other section of the robotic arm
Figure 4D:
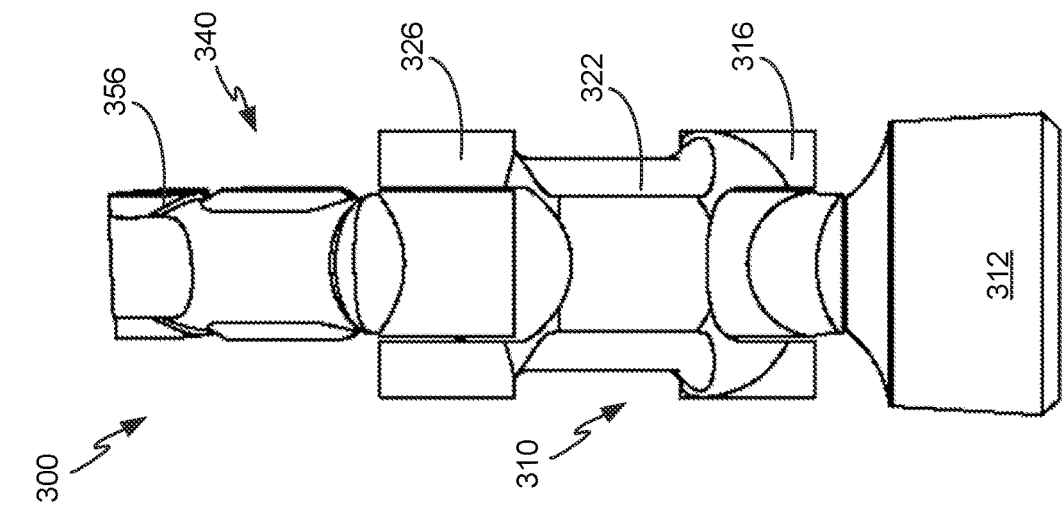
Figure 4C:
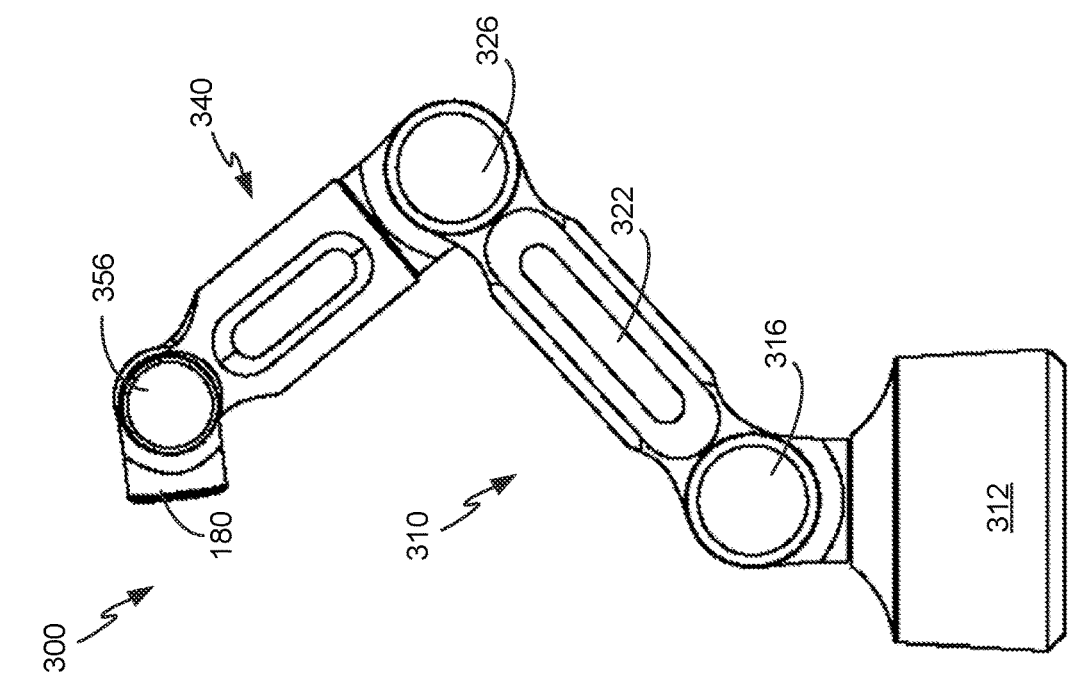
Figure 4B:
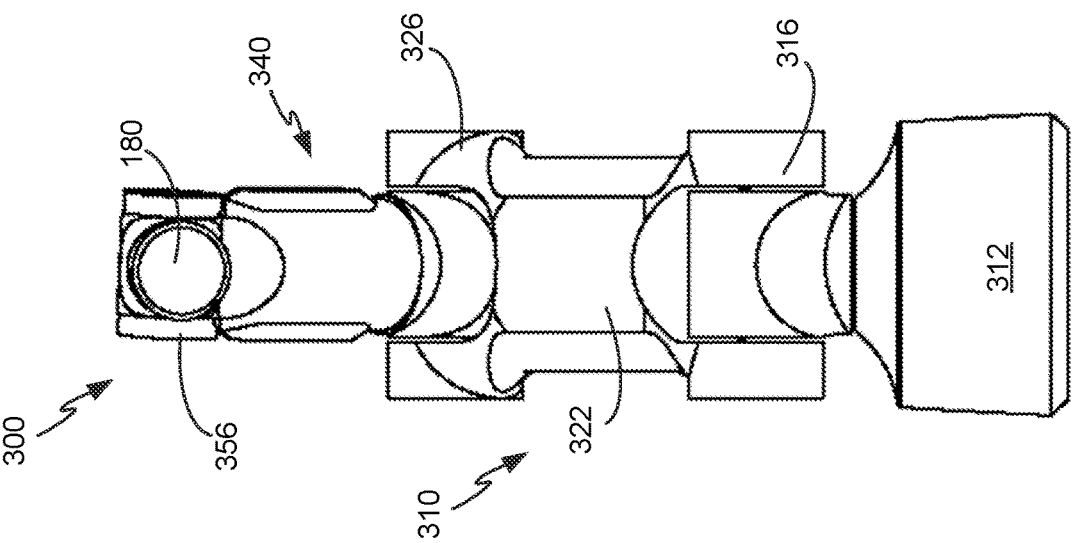
Figure 4E:
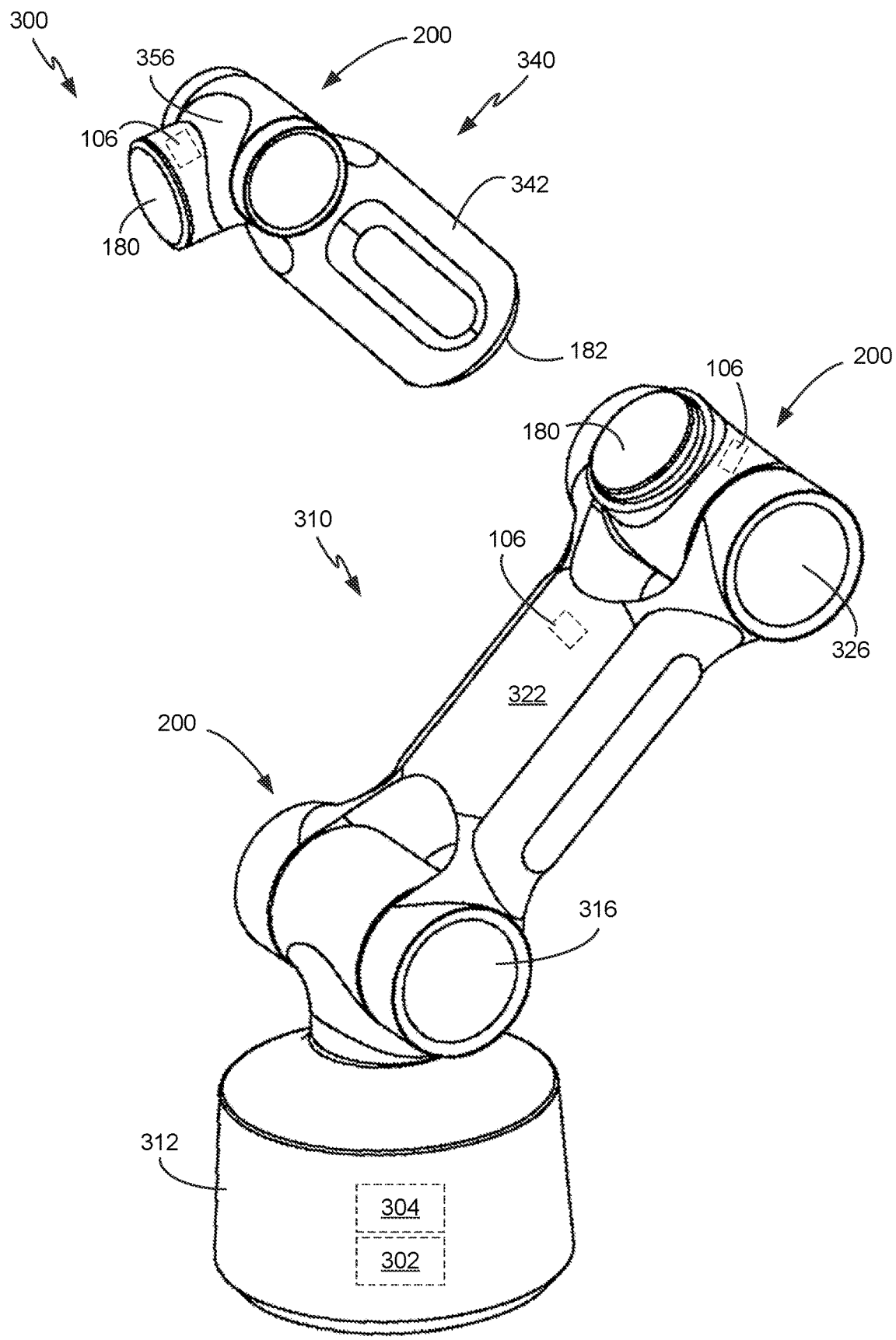
Figure 4G:
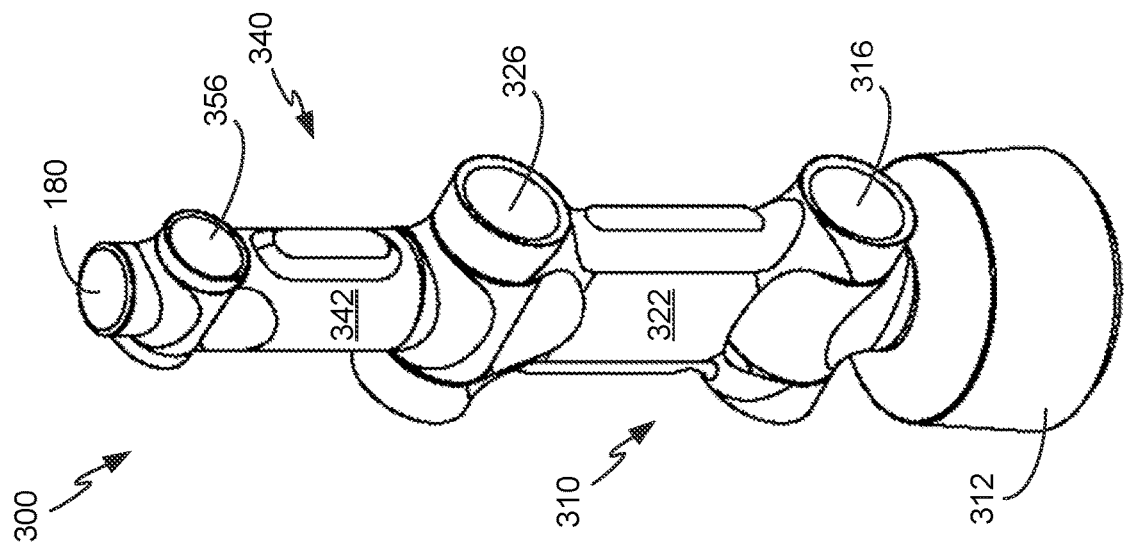
Figure 4F:
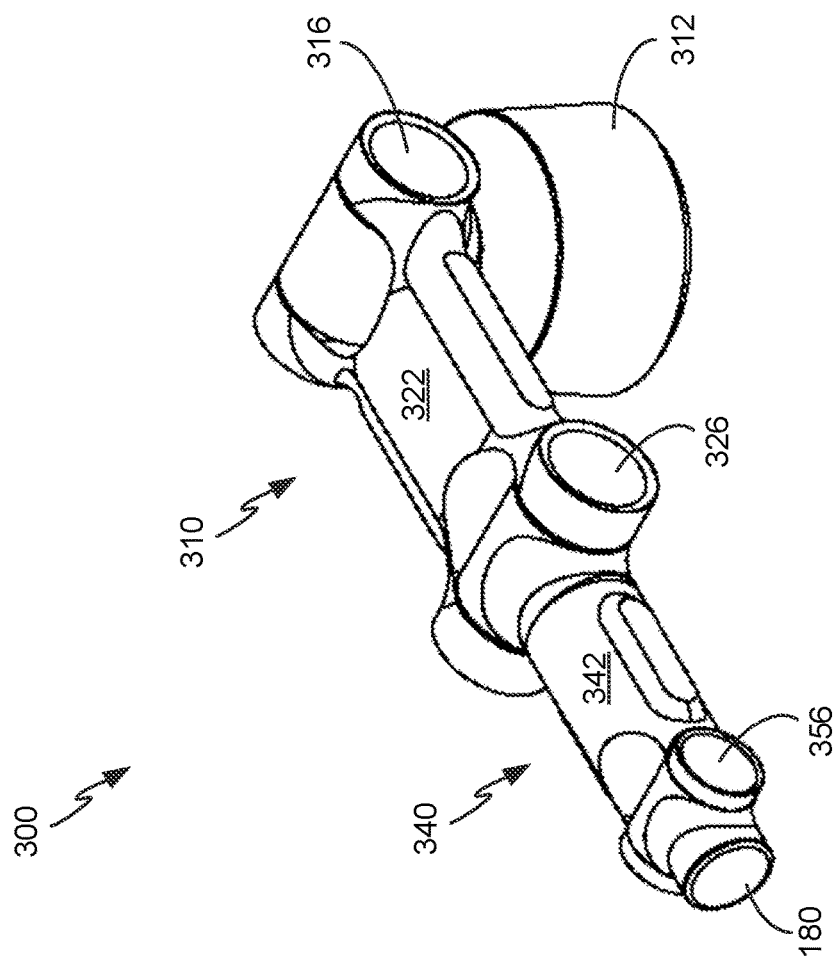
Figure 4H:
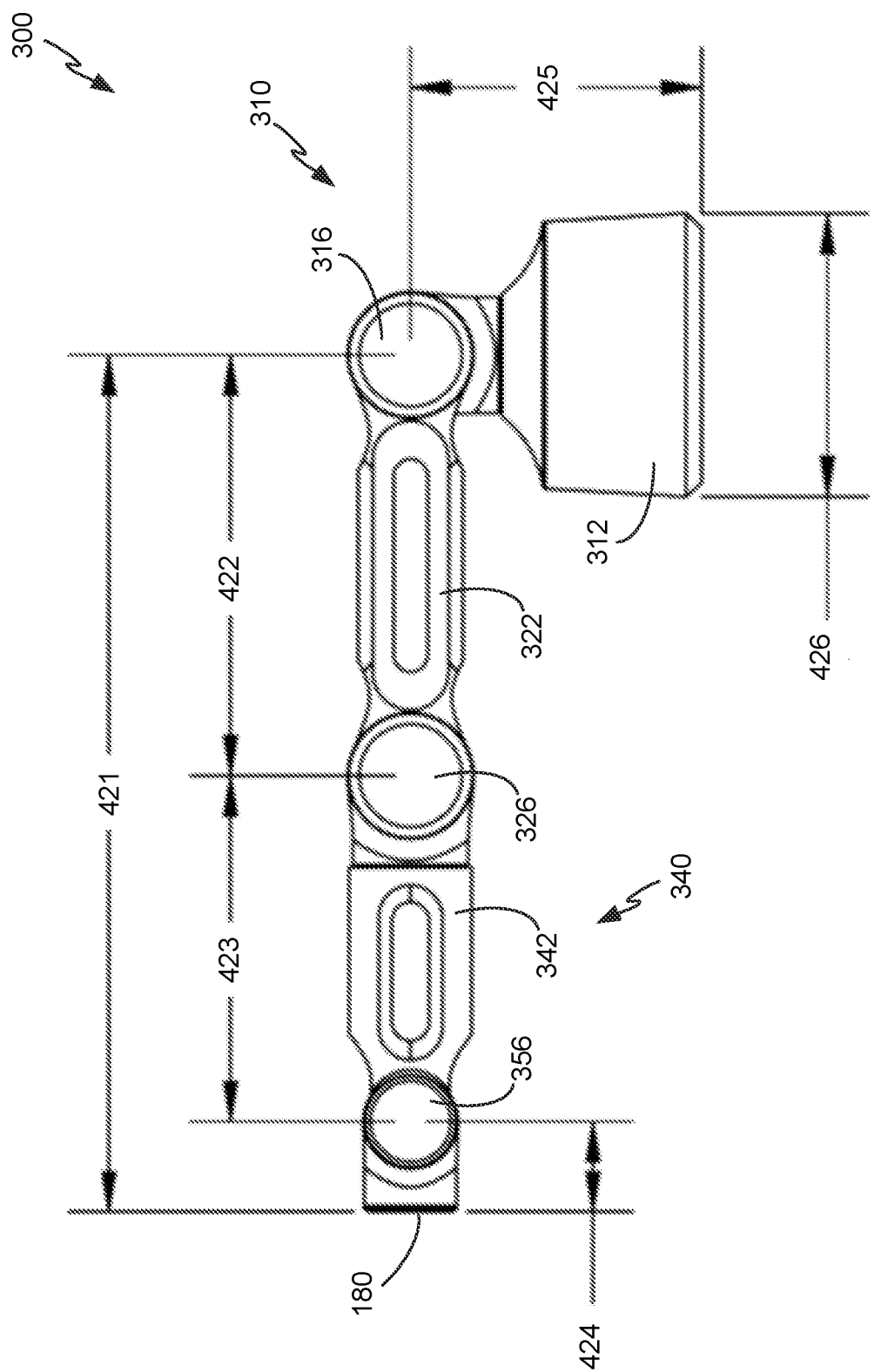
Figure 4I:
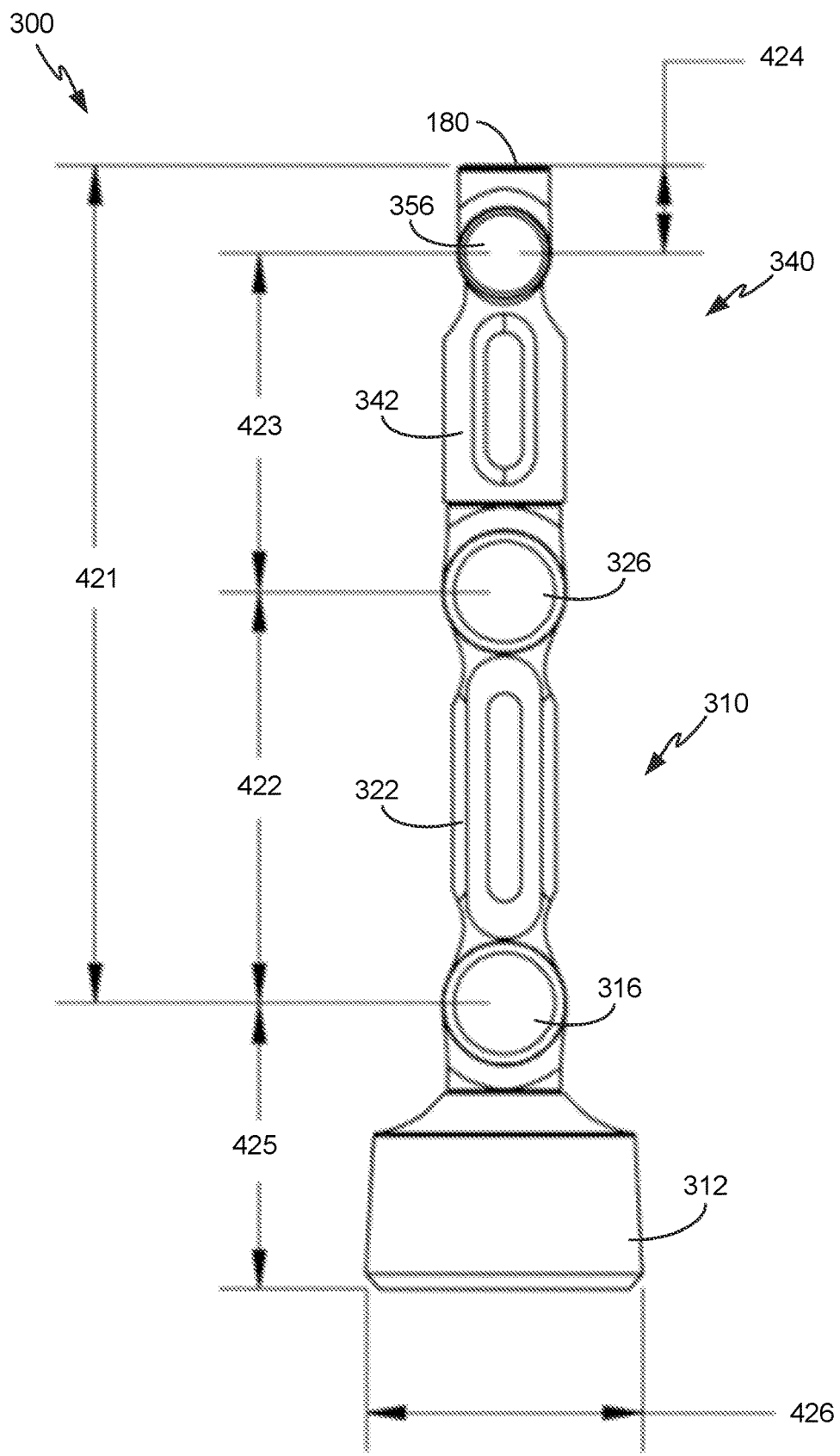

FIGS. 4A-4I illustrate a modular robotic arm 300 including differential joints 316, 326, 356 and a controller 302 in a base section 310 of the robotic arm 300. FIGS. 4A-4D are isometric, front, side and rear views respectively of the robotic arm 300. FIG. 4E is a perspective view of the different modular sections of robotic arm 300 including a base section 310 and a distal section 340. FIGS. 4F and 4G are also isometric views of the robotic arm 300. FIG. 4A illustrates the robotic arm 300 in a posed position, whereas FIG. 4F illustrates the robotic arm 300 in a full horizontal extension position, and FIG. 4G illustrates the robotic arm 300 in a full vertical extension position. Likewise, FIG. 4H is a side view of the robotic arm 300 in a full horizontal extension position with dimension notations, and FIG. 4I is a side view of the robotic arm 300 in a full vertical extension position with dimension notations.

Modular robotic arm 300 includes three differential joint assemblies 200 and a controller 302 in a base section 310 of the robotic arm 300. Modular robotic arm 300 is substantially similar to robotic arm 100 except robotic arm 300 includes three differential joint assemblies 200 rather than two differential joint assemblies 200 and two rotary joints (126, 156). For brevity, details discussed with respect to robotic arm 100 are discussed in limited or no detail with respect to robotic arm 300.

Robotic arm 300 includes two modular sections: a base section 310 and a distal section 340. The two modular sections may be interconnected with standard robotic interfaces. Due to the standard interfaces between the modular sections, the modular sections may be added or removed to form customized robotic arms including more than two modular sections or as few as a single section.

Base section 310 includes a proximal base 312 and a first arm segment 322 with a base joint 316 between the first arm segment 322 and the proximal base 312. A first arm joint 326 is on the opposite side of first arm segment 322 relative to the base joint 316. A first distal tooling flange 180 is on the opposite side of the first arm joint 326. Base joint 316 and arm joint 326 each include a differential joint assembly 200 providing both hinged and rotary motion.

Distal section 340 couples to the distal tooling flange 180 of the base section 310. Specifically, distal section 340 includes a mating tooling flange 182 for coupling to the distal tooling flange 180 of the base section 310. The mating tooling flange 182 is attached to an arm segment 342, and a second arm joint 356 is between a distal tooling flange 180 and arm segment 342. Arm joint 356 includes a differential joint assembly 200 providing both hinged and rotary motion.

Robotic arm 300 may further include an end effector with a mating tooling flange for coupling to the distal tooling flange 180 of the distal section 340. In various examples, the end effector may include automation, process, and/or sensing functions, including but not limited to a gripper, a welder, a sprayer, a grinder, a sander, a cutting implement and/or another mechanism.

The distal tooling flanges 180 and the mating tooling flanges 182 form a joint providing a mechanical connection, a power connection, and a data connection across the interface of the flanges. The distal tooling flanges 180 and the mating tooling flanges 182 may conform to one or more standard robotic interfaces for end effectors. Suitable standard robotic interfaces for end effectors include, but are not limited to, ISO end effector interface standards, such as, ISO 9409-1, for example, ISO 9409-1-50-4-M6, ISO 9409-2, and ISO 29262. Other interfaces including proprietary interfaces may also be used.

In the example of robotic arm 300, proximal base 312 includes a controller 302. In other examples, controller 302 may be located in distal section 340. Controller 302 serves to operate each of the joints of robotic arm 300 as well as the end effector according to a control program. In the example of robotic arm 300, base section 310 further includes control cables extending from the controller 302 to its distal tooling flange 180. In turn, distal section 340 includes control cables extending from its mating tooling flange 182 to its distal tooling flange 180. In some examples, proximal base 312 further includes a power supply 304, such as a battery, DC power supply, AC/DC converter, AC power supply or other power supply. In such examples, the control cables are configured to deliver power from the power supply to the distal tooling flange 180 of distal section 340.

In examples where controller 302 is in distal section 340, control cables extend from the controller to the distal tooling flange 380 via the intervening arm sections. Wherever the controller is located, the control cables also extend from the controller 302 to each motor of the arm joints 316, 326, 356.

As shown in FIG. 4E, robotic arm 300 may include one or more position sensors 106. In some examples, the accelerometers may be incorporated into controller 302. In such examples, it may be advantageous to locate the controller 302 and position sensor(s) 106 in the arm section closest to the end effector: distal section 340. In other examples one or more position sensors 106 may be located remotely from controller 302 and the control cables may connect the position sensors 106 to the controller 302.

Arm segments 322, 342 and arm joints 316, 326, 356 may include central apertures to facilitate routing power and/or control cables through the interior of robotic arm 300. As one example, one or more of arm joints 316, 326, 356 may include a differential joint assembly 200 as described with respect to FIGS. 3A-3G.

The different modular sections of robotic arm 300 may be sized according to design requirements of the robotic arm. In addition, otherwise identical segments of varying length may be selected for different applications, such that the same design may provide different reach according to an end user's requirements. In some examples, the different motors and joints may be of common sizes. In other examples, more distally located components (such as the components of distal section 340) may be lighter to reduce loading on the robotic arm.

FIG. 4H is a side view of the robotic arm 300 in a full horizontal extension position with dimension notations, and FIG. 4I is a side view of the robotic arm 300 in a full vertical extension position with dimension notations. While the particular relative and absolute sizes of the various components of the robotic arm 300 may vary, shown in TABLE 2 below are example dimensions the inventors found suitable for one particular application.

TABLE 2

| Sample dimensions | | | Reach 550 mm | Reach 700 mm | |
|---|---|---|---|---|---|
| Arm | Reach | 421 | 550 mm | 700 mm | 421 is the sum of |
| | | 422 | 225 mm | 300 mm | 422 + 423 + 424 |

TABLE 2-continued

| Sample dimensions | | Reach 550 mm | Reach 700 mm |
|---|---|---|---|
| | 423 | 225 mm | 300 mm |
| | 424 | 100 mm | 100 mm |
| Base | 425 | 310 mm | 310 mm |
| | 426 | 250 mm | 250 mm |

The specific techniques for robotic arms, including techniques described with respect to robotic arms 100, 190, 300, are merely illustrative of the general inventive concepts included in this disclosure as defined by the following claims.

What is claimed is:

1. A robotic arm comprising:
   a base section including a proximal base, a first arm joint, a first arm segment, and a first distal tooling flange;
   a middle section including a first mating tooling flange for coupling to the first distal tooling flange, a second arm joint, a second arm segment, and a second distal tooling flange,
   a distal section including a second mating tooling flange for coupling to the second distal tooling flange, a third arm joint, a third arm segment, and a third distal tooling flange; and
   an end effector including a third mating tooling flange for coupling to the third distal tooling flange;
   wherein one or more of the first arm joint and the second arm joint includes a first differential joint, wherein the first differential joint comprises:
      a carrier;
      a planet gear rotatably coupled to the carrier about a planet gear rotational axis;
      a flange fixedly coupled to the planet gear such that it is rotatably coupled to the carrier about the planet gear rotational axis;
      a first sun gear engaged with the planet gear and rotatably coupled to the carrier about a sun gear rotational axis;
      a second sun gear engaged with the planet gear and rotatably coupled to the carrier, the second sun gear in axial alignment with and opposing the first sun gear;
      a first motor with a first motor drive coupled to the first sun gear such that it is rotatably coupled to the carrier about the sun gear rotational axis;
      a second motor with a second motor drive coupled to the second sun gear such that it is rotatably coupled to the carrier about the sun gear rotational axis; and
      a motor support structure fixedly attached to a first housing of the first motor and further fixedly attached to a second housing of the second motor, wherein the motor support structure is rotatably coupled to the carrier about the sun gear rotational axis,
   wherein one or more of the first arm joint, the second arm joint, and the third arm joint includes a second differential joint.

2. The robotic arm of claim 1,
   wherein the first arm joint is between the first arm segment and the first distal tooling flange, and
   wherein the base section further includes a base joint between the first arm segment and the proximal base.

3. The robotic arm of claim 1, further comprising a controller in the proximal base, the first arm segment, or the second arm segment.

4. The robotic arm of claim 3, further comprising a power supply in the proximal base, the first arm segment, or the second arm segment.

5. The robotic arm of claim 3, wherein the controller is in the proximal base, the robotic arm further comprising:
base section control cables extending from the controller to the first distal tooling flange through the first arm joint and the first arm segment; and
middle section control cables extending between the first mating tooling flange to the second distal tooling flange through the second arm joint and the second arm segment.

6. The robotic arm of claim 1, wherein the planet gear includes a central aperture.

7. The robotic arm of claim 6, wherein the first differential joint forms a cable routing path including a flange aperture, the central aperture of the planet gear, a carrier aperture and a motor support structure aperture.

8. The robotic arm of claim 7, further comprising control and power wires extending through the cable routing path.

9. The robotic arm of claim 8, further comprising a sleeve surrounding control and power wires extending through the cable routing path.

10. A robotic arm comprising:
a base section including a proximal base, a first arm joint, a first arm segment, and a first distal tooling flange; and
a middle section including a first mating tooling flange for coupling to the first distal tooling flange, a second arm joint, a second arm segment, and a second distal tooling flange,
a distal section including a second mating tooling flange for coupling to the second distal tooling flange, a third arm joint, a third arm segment, and a third distal tooling flange;
an end effector including a third mating tooling flange for coupling to the third distal tooling flange;
wherein one or more of the first arm joint and the second arm joint includes a differential joint, wherein the differential joint comprises:
a carrier;
a planet gear rotatably coupled to the carrier about a planet gear rotational axis;
a flange fixedly coupled to the planet gear such that it is rotatably coupled to the carrier about the planet gear rotational axis;
a first sun gear engaged with the planet gear and rotatably coupled to the carrier about a sun gear rotational axis;
a second sun gear engaged with the planet gear and rotatably coupled to the carrier, the second sun gear in axial alignment with and opposing the first sun gear;
a first motor with a first motor drive coupled to the first sun gear such that it is rotatably coupled to the carrier about the sun gear rotational axis;
a second motor with a second motor drive coupled to the second sun gear such that it is rotatably coupled to the carrier about the sun gear rotational axis; and
a motor support structure fixedly attached to a first housing of the first motor and further fixedly attached to a second housing of the second motor, wherein the motor support structure is rotatably coupled to the carrier about the sun gear rotational axis,
wherein one or more of the first distal tooling flange, the second distal tooling flange, and the third distal tooling flange conform to a standard robotic interface for end effectors is selected from a group consisting of:
an ISO end effector interface standard;
ISO 9409-1;
ISO 9409-1-50-4-M6;
ISO 9409-2; and
ISO 29262.

11. The robotic arm of claim 10,
wherein the first arm joint is between the first arm segment and the first distal tooling flange, and
wherein the base section further includes a base joint between the first arm segment and the proximal base.

12. The robotic arm of claim 10, further comprising a controller in the proximal base, the first arm segment, or the second arm segment.

13. The robotic arm of claim 12, further comprising a power supply in the proximal base, the first arm segment, or the second arm segment.

14. The robotic arm of claim 12, wherein the controller is in the proximal base, the robotic arm further comprising:
base section control cables extending from the controller to the first distal tooling flange through the first arm joint and the first arm segment; and
middle section control cables extending between the first mating tooling flange to the second distal tooling flange through the second arm joint and the second arm segment.

15. The robotic arm of claim 12, wherein the planet gear includes a central aperture.

16. The robotic arm of claim 15, wherein the differential joint forms a cable routing path including a flange aperture, the central aperture of the planet gear, a carrier aperture and a motor support structure aperture,
wherein the robotic arm further comprises control and power wires extending through the cable routing path.

17. The robotic arm of claim 16, further comprising a sleeve surrounding the control and power wires extending through the cable routing path.

18. A robotic arm comprising:
a proximal base;
a first arm segment;
a first arm joint connecting the first arm segment to the proximal base;
a second arm joint;
a second arm segment connecting the first arm joint to the second arm joint;
a distal tooling flange connected to the second arm segment opposite the second arm joint;
a controller in the proximal base, the first arm segment, or the second arm segment; and control cables extending within the robotic arm from the controller to the distal tooling flange,
wherein one or more of the first arm joint and the second arm joint includes a differential joint, wherein the differential joint comprises:
a carrier;
a planet gear rotatably coupled to the carrier about a planet gear rotational axis;
a flange fixedly coupled to the planet gear such that it is rotatably coupled to the carrier about the planet gear rotational axis;
a first sun gear engaged with the planet gear and rotatably coupled to the carrier about a sun gear rotational axis;

a second sun gear engaged with the planet gear and rotatably coupled to the carrier, the second sun gear in axial alignment with and opposing the first sun gear;

a first motor with a first motor drive coupled to the first sun gear such that it is rotatably coupled to the carrier about the sun gear rotational axis;

a second motor with a second motor drive coupled to the second sun gear such that it is rotatably coupled to the carrier about the sun gear rotational axis; and a motor support structure fixedly attached to a first housing of the first motor and further fixedly attached to a second housing of the second motor, wherein the motor support structure is rotatably coupled to the carrier about the sun gear rotational axis, wherein the distal tooling flange conforms to a standard robotic interface for end effectors selected from a group consisting of:

an ISO end effector interface standard;
ISO 9409-1;
ISO 9409-1-50-4-M6;
ISO 9409-2; and
ISO 29262.

19. The robotic arm of claim 18, further comprising a power supply in the proximal base, the first arm segment, or the second arm segment, wherein the control cables are configured to deliver power from the power supply to the distal tooling flange.

20. The robotic arm of claim 18,
wherein the controller is the proximal base, and
wherein the control cables extend from the controller to the distal tooling flange through the first arm joint, the first arm segment, the second arm joint and the second arm segment.

21. The robotic arm of claim 18, further comprising an end effector including a mating tooling flange for coupling to the distal tooling flange.

22. The robotic arm of claim 18, wherein the distal tooling flange is a second distal tooling flange, the robotic arm further comprising a first distal tooling flange coupled with a first mating tooling flange between the first arm segment and the second arm segment.

23. The robotic arm of claim 18,
wherein the planet gear includes a central aperture,
wherein the differential joint forms a cable routing path including a flange aperture, the central aperture of the planet gear, a carrier aperture and a motor support structure aperture,
wherein the control cables extend within the robotic arm from the controller to the distal tooling flange through the cable routing path.

24. The robotic arm of claim 23, further comprising a sleeve surrounding the control cables extending through the cable routing path.

* * * * *